(12) United States Patent
Khan et al.

(10) Patent No.: US 11,922,792 B2
(45) Date of Patent: Mar. 5, 2024

(54) LUMINAIRE, AND A CORRESPONDING METHOD

(71) Applicant: SIGNIFY HOLDING B.V., Eindhoven (NL)

(72) Inventors: Shoaib Hussain Khan, Eindhoven (NL); Fetze Pijlman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 319 days.

(21) Appl. No.: 17/431,606

(22) PCT Filed: Feb. 10, 2020

(86) PCT No.: PCT/EP2020/053296
§ 371 (c)(1),
(2) Date: Aug. 17, 2021

(87) PCT Pub. No.: WO2020/169387
PCT Pub. Date: Aug. 27, 2020

(65) Prior Publication Data
US 2022/0137201 A1 May 5, 2022

(30) Foreign Application Priority Data
Feb. 22, 2019 (EP) .................... 19158719

(51) Int. Cl.
*G08B 25/10* (2006.01)
*G01S 7/02* (2006.01)
*G01S 7/41* (2006.01)
*G01S 13/56* (2006.01)
(Continued)

(52) U.S. Cl.
CPC .............. *G08B 25/10* (2013.01); *G01S 7/023* (2013.01); *G01S 7/415* (2013.01); *G01S 13/56* (2013.01); *G08B 13/189* (2013.01); *H05B 47/115* (2020.01)

(58) Field of Classification Search
CPC ....... G08B 25/10; G08B 13/189; G01S 7/023; G01S 7/415; G01S 13/56; G01S 7/288; G01S 7/354; G01S 13/88; H05B 47/115; H05B 47/105; Y02B 20/40; G01J 5/0025; G01J 5/026
See application file for complete search history.

(56) References Cited

U.S. PATENT DOCUMENTS

| 3,432,855 A | 3/1969 | Kalmus |
| 3,665,443 A | 5/1972 | Galvin |
| 5,451,961 A | 9/1995 | Rubin et al. |

(Continued)

FOREIGN PATENT DOCUMENTS

| CN | 104812300 B | * 11/2017 | ............... A61B 5/05 |
| CN | 107735920 A | * 2/2018 | ............ G08C 17/02 |

(Continued)

*Primary Examiner* — Abdullah A Riyami
*Assistant Examiner* — Syed M Kaiser

(57) ABSTRACT

Some embodiments are directed to a motion detector (100) configured to signal-process a motion signal to obtain multiple motion components, a motion component being correlated with a direction and velocity of a motion in the environment, cancel in motion components, two motion components that correspond to motions with opposite directions, and detect motion in the environment from the motion components that are not cancelled.

15 Claims, 8 Drawing Sheets

(51) Int. Cl.
   *G08B 13/189*     (2006.01)
   *H05B 47/115*    (2020.01)

(56) References Cited

U.S. PATENT DOCUMENTS

| | | | |
|---|---|---|---|
| 5,523,815 A * | 6/1996 | Tamura | G03B 9/24 |
| | | | 359/228 |
| 9,261,548 B2 | 2/2016 | Tanaka et al. | |
| 10,415,286 B1 * | 9/2019 | Porcella | E05D 11/10 |
| 2001/0026264 A1 * | 10/2001 | Rosenberg | A63F 13/211 |
| | | | 345/156 |
| 2010/0109934 A1 | 5/2010 | Drake et al. | |
| 2012/0206288 A1 | 8/2012 | Murakami et al. | |
| 2013/0041856 A1 | 2/2013 | Benitez et al. | |
| 2013/0058489 A1 | 3/2013 | Tanaka et al. | |
| 2016/0229333 A1 * | 8/2016 | Shiraki | B60Q 9/008 |
| 2018/0263502 A1 | 9/2018 | Lin et al. | |
| 2018/0286259 A1 * | 10/2018 | Ni | A63F 13/5372 |
| 2019/0208270 A1 * | 7/2019 | Bates | H04N 21/43615 |
| 2019/0251813 A1 * | 8/2019 | Chen | G08B 13/2491 |
| 2019/0370545 A1 * | 12/2019 | Josephson | G06T 7/70 |

FOREIGN PATENT DOCUMENTS

| | | |
|---|---|---|
| DE | 102014226891 A1 | 6/2016 |
| DE | 102016213007 A1 | 1/2018 |
| FR | 2441179 A1 | 6/1980 |
| GB | 2310099 A1 | 8/1997 |
| GB | 2562829 A | 11/2018 |
| JP | S5563774 A | 5/1980 |
| JP | S5637596 A | 4/1981 |
| JP | 2004085293 A | 3/2004 |
| JP | 2008133585 A | 6/2008 |
| JP | 2008202246 A | 9/2008 |
| JP | 2011047779 A | 3/2011 |
| JP | 2012168048 A | 9/2012 |
| JP | 5895213 B2 | 3/2016 |
| JP | 2016174869 A | 10/2016 |
| KR | 20160141503 A | 12/2016 |
| KR | 101766729 B1 | 8/2017 |

\* cited by examiner

LUMINAIRE, AND A CORRESPONDING METHOD

CROSS-REFERENCE TO PRIOR APPLICATIONS

This application is the U.S. National Phase application under 35 U.S.C. § 371 of International Application No. PCT/EP2020/053296, filed on Feb. 10, 2020, which claims the benefit of European Patent Application No. 19158719.5, filed on Feb. 22, 2019. These applications are hereby incorporated by reference herein.

FIELD OF THE INVENTION

The invention relates to a luminaire, a motion detection method, and a computer readable medium.

BACKGROUND OF THE INVENTION

Reliable motion detection is important in a number of fields. For example, motion detection is used in lighting systems to control the lighting. Using a motion detector it can be avoided that lights are turned on when no persons are present. Other applications are, e.g., in burglar alarms, and office occupancy detection, e.g., for office management.

Unfortunately, motion sensing suffers from a number of problems. One problem for motion sensors is that they can be sensitive to a particular type of narrow-frequency noise, which is sometimes referred to a hum, or hum-type noise. In particular, sensors based on the Doppler effect are vulnerable to false positives caused by hum noise.

A known motion sensor is described in Korean patent application KR20160141503, "APPARATUS AND METHOD FOR DRIVING LIGHT". In the Korean patent application a lighting driving device is disclosed for driving a lighting device equipped with a motion sensing part. The device automatically controls lighting depending on whether motion is detected or not.

The motion detection unit is a microwave (RF) Doppler sensor and uses the Doppler effect to detect a motion by detecting a wave generated by a wave source. The motion sensing unit detects not only the movement of the object but also vibrations occurring in the surroundings. There is thus the problem that the lamp may be turned on when only vibrations occur but no movement.

FIG. 1 of the cited patent illustrates the known lighting driving device. The known device includes a vibration sensing unit 11 for sensing a vibration in addition to the motion sensing unit 12.

The motion sensing unit 12 is a RF Doppler sensor that senses motion using a Doppler effect using microwave (RF) and outputs a motion sensing signal of a corresponding size. The vibration sensing unit 11 is a micro-electro-mechanical system (MEMS) which measures an acceleration and senses vibration, and outputs an electrical signal of a corresponding magnitude as a vibration sensing signal.

A controller lights an illumination device 4 when motion is detected by the motion detection unit 12, but only at a time when no vibration is detected. This prevents the illumination device 4 from being turned on when a vibration is detected.

US2018/263502A1 discloses using a radar signal for estimation of heart rate, change in heart rate, respiration rate, and/or change in respiration rate, for a human or other animal. The respiration movement in the radar baseband output signal can be estimated. The estimated respiration signal can then be subtracted from radar signals in the time domain and, can be further enhanced using digital signal processing techniques, to produce an estimate of the heartbeat pulses.

SUMMARY OF THE INVENTION

The known system has a number of drawbacks. First of all, the known system requires a separate vibration sensor in addition to the motion sensor. This increases the list of parts, increases system complexity and costs. Second, so long as a vibration is detected no motion can be detected. Hum can be intermittent, and may last only a few seconds, but the inventors have observed that hum-type noise can also last for hours. Such a persistent hum would turn the known system inoperable, since while the hum lasts, no motion is detected and thus no lights are turned on. Alternatively, the threshold for vibrations may be set at a high level, so that the risk of false positives caused by one or more hum noise sources remains. Third, the known system detects only mechanical vibrations. However, the inventors observed that hum noise can also originate from an electrical source.

To address these and other problems, a luminaire comprising a motion detector is proposed. The motion detector comprises:
  a motion sensor interface configured to receive a motion signal from a motion sensor, said motion signal being correlated with motion in an environment of the motion sensor,
  a processor system configured to
    signal-process the motion signal to obtain multiple motion components, a motion component being correlated with a direction and velocity of a motion in the environment,
    cancel in the motion components, two motion components that correspond to motions with opposite directions,
    detect motion in the environment from the motion components that are not cancelled. The luminaire is being connectable to a light-emitting element and being configured to control the light-emitting element at least in dependency upon the motion detector.

The motion detection has the advantage that no separate vibration sensor is needed. Instead, hum noise can be removed from the motion sensor's output. For example, in an embodiment, the determining may comprise determining an energy in the remaining frequency bins. The environment may then be classified as motion, e.g., if the determined energy exceeds a threshold. Frequency bins may be implemented as the coefficients produced by a frequency domain conversion, e.g., FFT, DFT, etc. A frequency bin is termed bin since it actually corresponds to a narrow range of frequencies, which for a Doppler sensor in turn corresponds to a narrow range of velocities in the area surrounding the sensor.

It was an insight of the inventors that a vibration in the environment comprises two motions with opposite directions. By removing motion components that have such a profile, vibration noise is reduced.

In an embodiment, the motion signal comprises a first channel (I) and a different second channel (Q), the first and second channel being correlated with motion in the environment of the motion sensor. Having access to two channels is one way in which motion direction can be determined from a motion sensor.

For example, by performing a frequency transformation, motion components may be obtained that correspond to a frequency, e.g., both positive a negative frequencies. Conventionally, movement toward and from the sensor may be expressed as positive and negative frequencies respectively, or the other way round. Accordingly, noise cancelation may comprise subtracting a motion component corresponding to a positive frequency from the motion component with the corresponding negative frequency. Frequency transformation is typically done using a Fourier transformation, e.g., FFT, but another option is to apply a wavelet decomposition to obtain the motion components.

Due to imperfections in the motion sensor, a true motion, e.g., non-hum noise, e.g., a walking person, may cause a contribution to one or more motion components with a positive frequency, but inadvertently also to the corresponding negative frequencies. By subtracting the motion components, this may reduce the energy in a positive signal, which may increase the chance of a false negative (e.g., the detector not detecting motion even though there is motion present). This may be avoided by applying a correction factor which corrects for imperfections of the sensor. For example, in an embodiment, a correction factor may be applied to a motion components before subtracting two motion components. Interestingly symmetrizing the application of the correction factor can cause the resulting factor to still cancel hum-noise.

An aspect of the invention concerns a motion detection method.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments of the invention will be described, by way of example only, with reference to the drawings. Elements in the Figures are illustrated for simplicity and clarity and have not necessarily been drawn to scale. In the Figures, elements which correspond to elements already described may have the same reference numerals. In the drawings, FIG. 1a schematically shows an example of an embodiment of a motion detector, FIG. 1b schematically shows an example of an embodiment of a luminaire, FIG. 1c schematically shows an example of an embodiment of a lighting system.

Figure 1A:
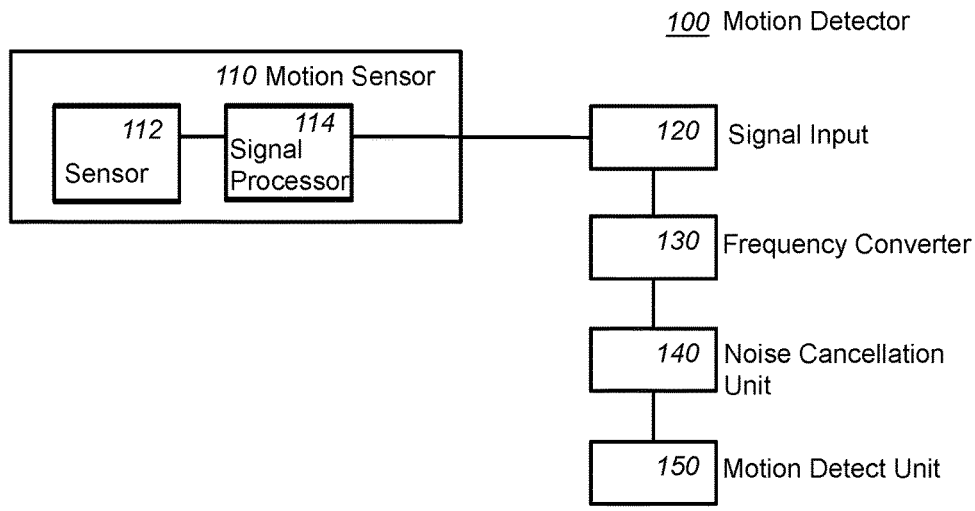

LIST OF REFERENCE NUMERALS IN FIGS.
1a-5b, 7a-7b 100, 101, 102 a motion detector
110 a motion sensor
112 a sensor
114 a signal processing unit
120 a signal input
130 a frequency domain converter
140, 141 a noise cancelation unit
150 a motion detect unit
162 a correction term estimator
164 a correction term storage
170 a luminaire
171 a lighting system
172 a lighting element
173 a computer network
175 a lighting controller
210, 220, a spectrum
230, 240 a spectrum
211, 213 a peak
212 positive frequencies
214 negative frequencies
221 a peak
223 no peak
411, 413 hum-noise related peaks
412 motion related peak
414 no peak
500 a motion sensor
510 a transmission signal generator
511 a transmitter
512 a receiver
520 a phase shifter
530 a mixer
540 a mixer
550 a low-pass filter
560 a low-pass filter
551 a Q-signal
561 an I-signal
1000 a computer readable medium
1010 a writable part
1020 a computer program
1100 a device
1110 a system bus
1120 a processor 1130 a memory
1140 a user interface
1150 a communication interface
1160 a storage
1161 an operating system
1162, 1163, 1164 instructions

DETAILED DESCRIPTION OF EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1a schematically shows an example of an embodiment of a motion detector 100.

Figure 1B:
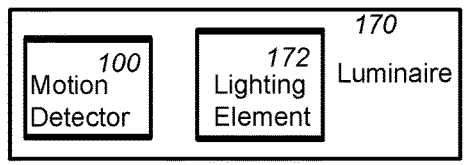
Figure 1C:
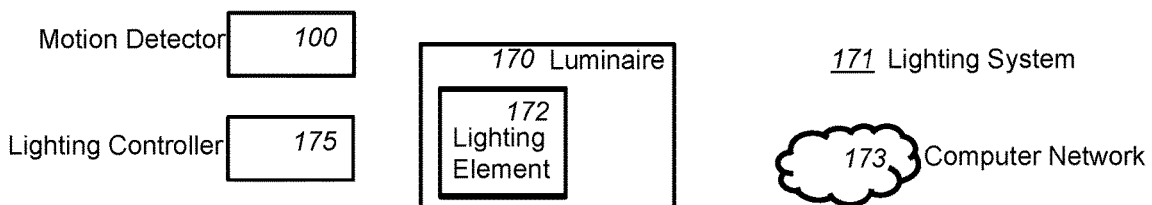

The motion detector can be used for a variety of applications, particularly advantageous of which is illumination. For example, FIG. 1b schematically shows an example of an embodiment of a luminaire 170. Luminaire 170 may comprise motion detector 100 and a lighting element 172. For example, the lighting element may be configured to radiate light when motion detector 100 detects motion. The lighting element may be one or more LEDs. For example, FIG. 1c schematically shows an example of an embodiment of a lighting system 171. Lighting system 171 comprises a luminaire 170, typically multiple luminaires, a motion detector 100, typically multiple motion detectors, and a lighting controller 175. Lighting controller 175 is configured to receive motion signals, e.g., quiet/motion classifications from the motion detector(s) and determine, based thereupon, a lighting control signal. The lighting control signal is sent to the one or more luminaires, who then illuminates in accordance with the control signal. One or more of the motion detectors may be incorporated in the luminaires, but that is not needed. The communication between motion detector, lighting controller and luminaire may proceed over a digital communication network, e.g., a computer network.

For example, the various devices of system 171 may communicate with each other over a computer network 173. The computer network may be an internet, an intranet, a LAN, a WLAN, etc. Computer network 173 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of system 171 as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. For example, the devices 100, 175 and 170 may each comprise a communication interface. Computer network 173 may comprise additional elements, e.g., a router, a hub, etc.

The execution of motion detector 100 may be implemented in a processor circuit, examples of which are shown herein. FIG. 1a for example shows functional units that may be functional units of motion detector and, e.g., of the processor circuit. For example, FIG. 1a may be used as a blueprint of a possible functional organization of the processor circuit. The processor circuit is not shown separate from the units in FIG. 1a. For example, the functional units shown in FIG. 1a may be wholly or partially implemented in computer instructions that are stored at device 100, e.g., in an electronic memory of device 100, and are executable by a microprocessor of device 100. In hybrid embodiments, functional units are implemented partially in hardware, e.g., as coprocessors, e.g., signal coprocessors, and partially in software stored and executed on device 100.

There are other applications for a motion detector than lighting control. For example, a motion detector may be used in a burglar alarm. For example, motion sensors may be used to detect occupancy in offices, which in turn may be used to manage the office, e.g., to suggest an empty office for use, or report on office occupancy over time.

Motion detector 100, as shown in FIG. 1a, comprises a motion sensor 110; this is not necessary though. The motion detector 100 may use an external motion sensor. Part of the signal processing may be done in the external motion sensor or in the motion detector itself. In an embodiment, the motion sensor 110 may be an integral part of motion detector 100. Motion sensor 110 is configured to generate a sensor signal for the motion detector.

There are various choices for the motion sensor. For example, motion sensor 110 may be a Doppler motion sensor, micro-wave sensor, or ambient light sensor, etc. As a motivating example, embodiments below will be described for a Doppler sensor. It is noted however, that the motion detector may be combined with any motion sensor for which noise is problem, especially noise of hum-type.

In an embodiment, the motion sensor 110 may comprise a sensor 112 and a processing unit 114. The processing unit 114 may perform pre-processing before the signal is further processed by the rest of motion detector 100. Processing unit 114 is optional.

For example, in an embodiment, motion sensor 110 may be of Doppler type. For example, a Doppler sensor may be configured to detect motion or speed of moving objects through the Doppler principle. Sensor 112 may be configured to transmit a signal, for example, a microwave signal. For example, the transmitted signal may have a frequency of from 5 to 30 Ghz, and/or from 30-100 GHz, etc., lower or higher is also possible. Examples of signal frequencies include: 5.8 GHz, 24 GHz, and 60 GHz. For example, the transmitted signal may have a frequency in the super high frequency band (SHF) or Extremely high frequency band (EHF).

Sensor 112 may be configured to receive the signal back. A shift in the frequency signal is related to the speed with respect to the sensor of moving objects that reflected the transmitted signal. For example, one way of processing in a Doppler sensor is to compute a product of the transmitted signal and the received signal, and to apply a low-pass filter to the multiplied signals. It can be shown with geometric functions that the resulting signal comprises the frequency shifts. For example, processing unit 114 may be configured to multiply the transmitted and received signal and apply a low-pass filter.

The resulting signal is provided to a signal input 120 of motion detector 100. For example, signal input 120 may be an internal input. Signal input 120 may also be an input-port, e.g., an electronic input port, or a digital input port, e.g., an API, or the like. For example, in an embodiment the sensor signal of motion sensor 110 received at signal input 120, may be a signal in which frequency components correspond to Doppler shifts and thus to velocities of objects in the area surrounding sensor 110. In an embodiment, the signal is a received signal reflected of objects in the surrounding area. In the latter case further Doppler processing may be performed after receiving the signal at the signal input.

In an embodiment, the motion sensor interface 120 is configured to receive a motion signal from motion sensor 110. The motion signal being correlated with motion in an environment of the motion sensor. In particular, the motion signal is arranged such that motion direction in the environment is correlated to the motion signal. The correlation need not be perfect. For example, it is sufficient if the correlation is only with a projection of the motion direction. For example, a motion direction may be directed onto the line from the moving object toward sensor 110. For example, some noise canceling can be achieved if two equal motions with opposite directions, e.g., with respect to each other, can be distinguished from each other in the motion signal. In an embodiment the motion signal are the Q and I time-domain signals.

In an embodiment, motion sensor 110 is a so-called two-channel sensor, e.g., the motion signal contains two channels each of which is correlated to motion in the environment. Because two channels are available, more information regarding the direction of movements in the environment can be obtained. For example, in an embodiment, the motion signal comprises a first channel (I) and a different second channel (Q), the first and second channel being correlated with motion in the environment of the motion sensor.

In an embodiment, the first channel and the second channel have been obtained by mixing a received reflection signal with a first and second mixing signal respectively, the first and second mixing signal having at least 30 degree phase difference, preferably, at least 70 degrees phase difference, more preferably 90 degree phase difference.

For example, the motion sensor may be a two-channel Doppler microwave sensor. The output of the sensor may already be processed by signal processing unit 114 into an I and Q channel, but this is not necessary; for example, the motion sensor may export the raw received signal and have the signal processing done in motion sensor 110.

Figure 3:
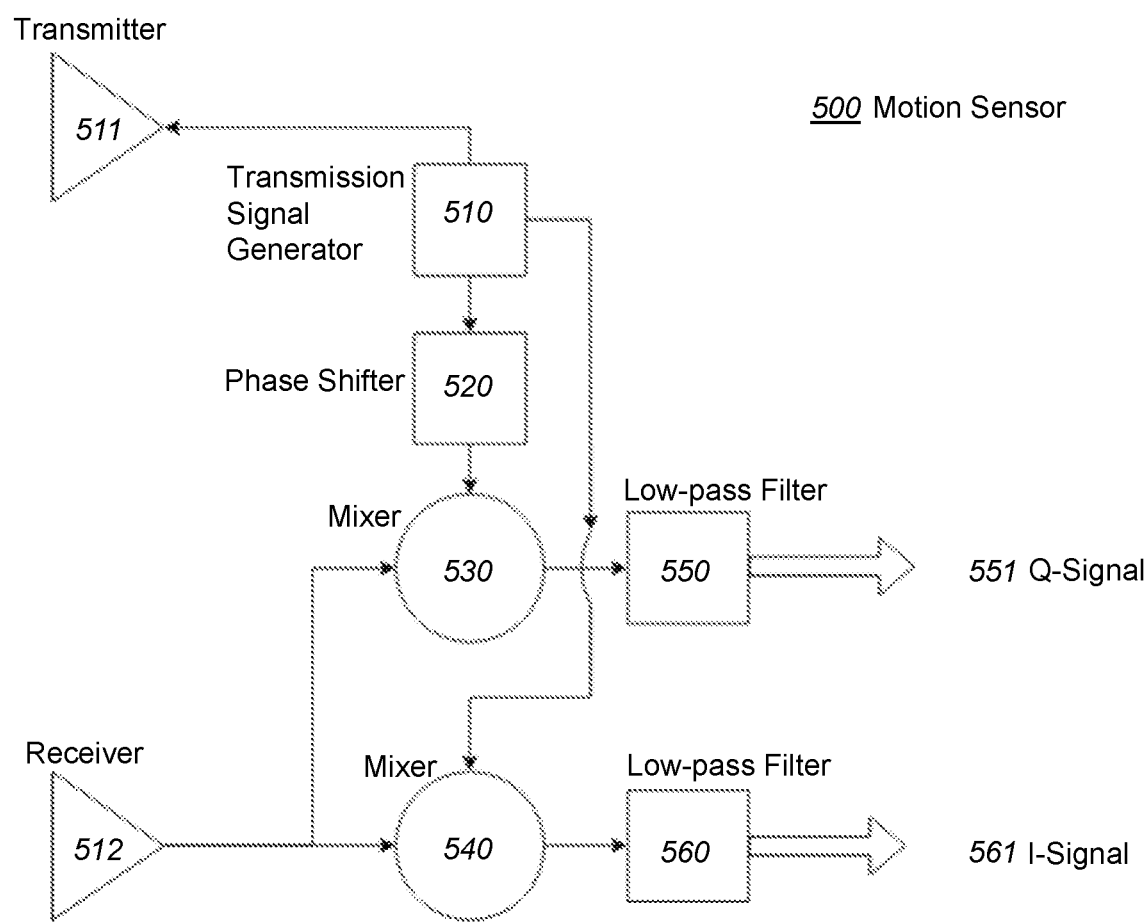

FIG. 3 schematically shows an example of an embodiment of a dual-channel motion sensor 500. For example, dual-channel motion sensor 500 may be used for motion sensor 110. FIG. 3 shows merely one architecture of a motion sensor 110 and other choices are possible.

FIG. 3 shows a transmission signal generator configured to generate a signal, e.g., a sinusoidal signal, for transmission through a transmitter 110. The transmitted signal reflects of objects in the environment of sensor 500. The reflections are received in a receiver 512. The received signal is mixed with the transmitted signal in a mixer 540, and led through a low-pass filter 560 to obtain an in-phase signal 561, e.g., I-channel 561. The transmitted signal 510 is also subjected to a phase shift, typically shifted over 90 degrees. The received signal is mixed with the phase-shifted transmitted signal in a mixer 530, and led through a low-pass filter 550 to obtain a quadrature signal 551, e.g., Q-channel 551. Typically, phase-shifter 520 shifts over 90 degrees, but this may be different. In particular, due to inaccuracies, the shift may be slightly more or less. For example, the phase shift of phase shifter 520 may be between 85 and 95 degrees.

A shift over 270 is considered to be equivalent to a shift over 90 degrees. Non-ideal components, such as amplifiers, and phase shifter 520, etc., may also introduce a slight change in the amplitude of the signal. As a result of these factors, the two channels may deviate a bit from a perfect I and Q channel. Assuming the deviations are sufficiently small with respect to a bin-size of the frequency transformation that is to follow, this will still allow noise cancellation, at least to an extent. It is possible to correct for inaccuracies in motion sensor 110, 500 and its signal processing. Such corrections are further explained below, and are optional.

Many variations are possible for motion sensor 500. For example, mixing and filtering may be done analog and/or digital. For example, motion sensor 500 may comprise one or more antenna. Mixing may be implemented as multiplication between the two signals. For example, in an embodiment, a raw received signal is mixed with a first signal and with a second signal that differs a phase. Some components may be re-used, etc.

Returning to FIG. 1a, signal 551 and 561 may be received by motion sensor 100 in signal interface 120.

Motion detector 100 comprises a frequency domain converter 130, a noise cancelation unit 140 and a motion detect unit 150. Frequency domain converter 130 converts the received signal from a time domain to a frequency domain. For example, converter 130 may perform a Fourier transformation. For example, converter 130 may perform a Discrete Fourier transform (DFT). If needed converter 130 may first perform an analog to digital conversion, e.g., an ADD conversion, e.g., before performing the conversion to the frequency domain.

In an embodiment, the signal-processing of frequency domain converter 130 comprises transforming the motion signal from a time-domain to a frequency-domain to obtain multiple motion components. A motion component represents motions at particular velocities and direction with respect to the sensor. A motion components may further represent motions at particular distances with respect to the sensor. Typically, a motion component is sensitive to a range of velocities. Preferably, motion with an opposite direction with respect to the sensor corresponds to a different motion component.

The multiple motion components may be coefficients of the frequency transform, e.g., FFT, DFT, etc., of the motion signal. For example, the multiple motion components may be frequency bins of the frequency domain converter. In an embodiment, the frequency domain conversion is performed on a combination of the two channels, e.g., of the I and Q channel. In particular, the transform may be a complex transform; for example, the frequency transform may be applied to the complex combination (I+jQ), wherein j represents the complex unity. The result of said frequency transformation may be a complex signal. For example, complex amplitudes may be obtained for the frequency bins.

In an embodiment, the motion signal received in input 120 is portioned into portions, e.g., portions with a pre-determined number of time-domain samples. On each of the portions the frequency conversion may be performed. As a result, so-called frequency bins are obtained. A frequency bin is the amplitude of a range of frequencies that is present in the received signal. For example, one frequency bin may represent the frequency range from 40-42 Hz. The frequency range corresponding to a frequency bin may be, e.g., about 2 Hz, or more, or less, say in the range from 0.5 to 5 Hz. A magnitude for a frequency bin may be taken as the absolute value of the amplitude. In an embodiment, the signal-processing may be configured to detect motion components within a time period or time slice. The time-period may be say a second, a half-second, etc. In an embodiment, the time period is less than 30 seconds.

For example, a frequency conversion may be performed each time after a pre-determined number of time-domain samples have been obtained. For example, every 24 time-domain samples a frequency domain conversion may be performed. For example, in an embodiment, a 5.8 Ghz sensor, is combined with 24 time-samples per time-slice.

For example, one can sample at 250 Hz, and take for every 24 new samples an FFT with a length of 128 points. In this case the FFTs are overlapping. For light switching one preferably reports motion quickly, e.g., in 0.5 s. With the example above one has a few FFT for making the decision. For other situations, one can take more time: for example, when trigger on motion when the light is already on, or for occupancy detection.

As a result the frequency bins show an evolution over time; an increase in a frequency bin, e.g., an increase in the magnitude for a particular frequency range may correspond to an increase in a particular velocity in the area surrounding the sensor. The increase in a frequency bin may indicate motion in the area. A high-pass or low-pass filter, or both may be applied to the signal, or to the bins, to eliminate frequencies that are too high or too low to be usable.

In an embodiment of a frequency domain converter, the motion signal is signal-processed to obtain multiple motion components. For example, the multiple motion components may be the coefficients of a frequency transform of the I+jQ. A motion component is correlated with a direction and velocity of a motion in the environment. In particular, two motions with opposite directions contribute to two different motion components that correspond to motions with opposite directions.

In particular, motions with a direction that is opposite with respect to each other, contribute to different motion components, e.g., to a motion component associated with a positive and a negative frequency. In practice this will be the case, even if the motion direction is detected with respected, e.g., projected onto, the view-direction of the motion sensor. In an embodiment, motions with opposite directions contribute to different motion components of the multiple motion components.

It is sufficient that the motion sensor only measures speed towards or away from the sensor, which may be referred to as projected speed. Interestingly, objects that vibrate hardly change in position which makes that the amplitude of velocity towards and away of the sensor is equal.

Terms like opposite direction and same speed should be understood to mean within a threshold. The threshold may be implicit. For example, if two movements contribute to opposite Fourier coefficient they may be regarded as opposite directions.

In an embodiment, the multiple motion components correspond to a frequency of the frequency transform. In particular, for a two channel I and Q sensor, motions with opposite directions contribute to motion components having the same frequency but an opposite sign.

Figure 2A:
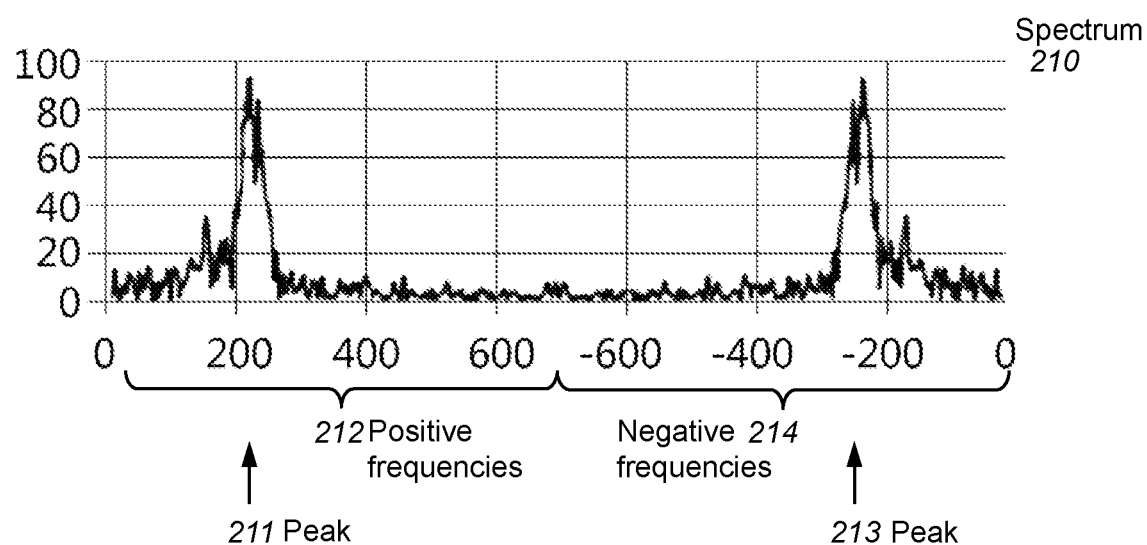
FIG. 2a shows a graph of a magnitude of a FFT transform of a single-channel motion sensor signal.

FIG. 2a shows a graph of a magnitude of a FFT transform of a single-channel motion sensor signal. Shown in FIG. 2a is the spectrum obtained when a person walks towards the sensor. Positive frequencies are shown at 212, and negative frequencies at 214. In this example, use was made of a single-channel motion sensor in which the motion signal does not contain information on the direction of a motion. In particular, FIG. 2a was obtained by performing a real FFT on I channel data only. The obtained motion components are unable to give direction information. Note that the FFT values are duplicated after N/2 of the FFT bins.

Peak 211 shown in spectrum 210 corresponds to the motion of the walking person. However, the peak is repeated at 213 which is indicative of the lack of sensitivity to motion direction.

Figure 2B:
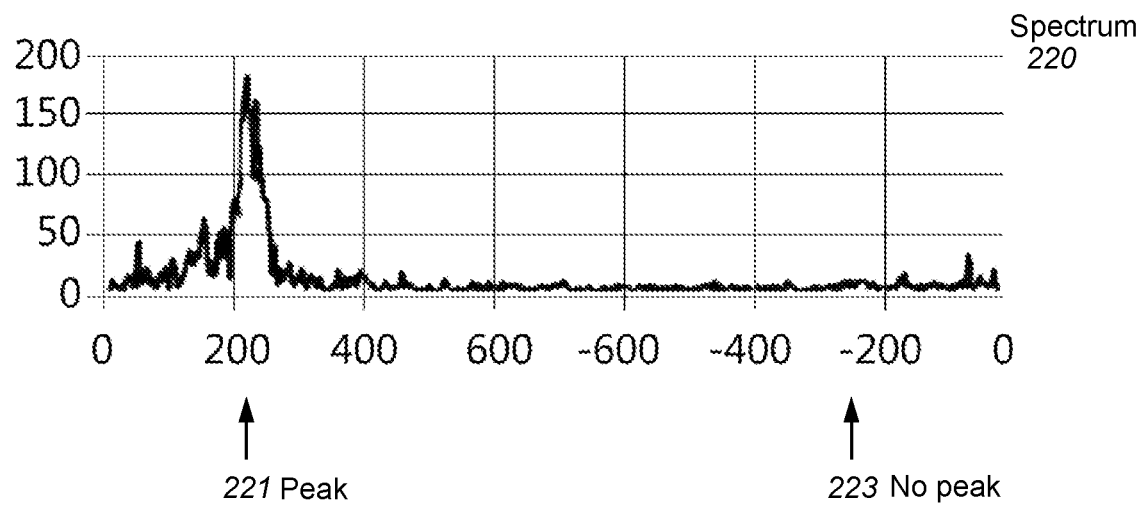
FIG. 2b shows a graph of a magnitude of a FFT transform of a dual-channel motion sensor signal.

FIG. 2b shows a graph of a magnitude of a FFT transform of a dual-channel motion sensor signal. Shown in FIG. 2b is the spectrum obtained when a person walks towards the sensor. In this example, use was made of a dual-channel motion sensor in which the motion signal contains information on the direction of a motion. In particular, FIG. 2b was obtained by performing a complex FFT on I and Q channel data. The obtained motion components do give direction information. Note that the FFT values are not duplicated after N/2 of the FFT bins. FIG. 2b shows the magnitude of the frequency bins.

Peak 221 shown in spectrum 220 corresponds to the motion of the walking person. The peak is not repeated at negative frequency 223 which is indicative of the lack of sensitivity to motion direction.

Figure 2C:
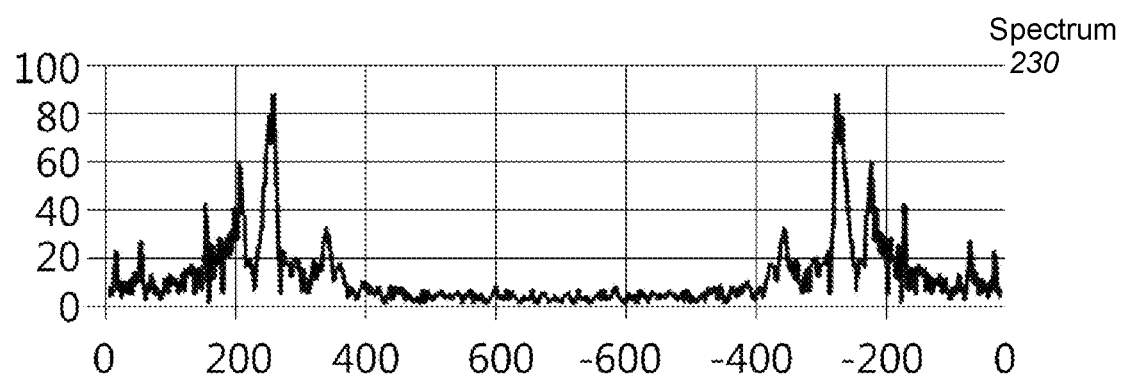
FIG. 2c shows a graph of a magnitude of a FFT transform of a single-channel motion sensor signal.
Figure 2D:
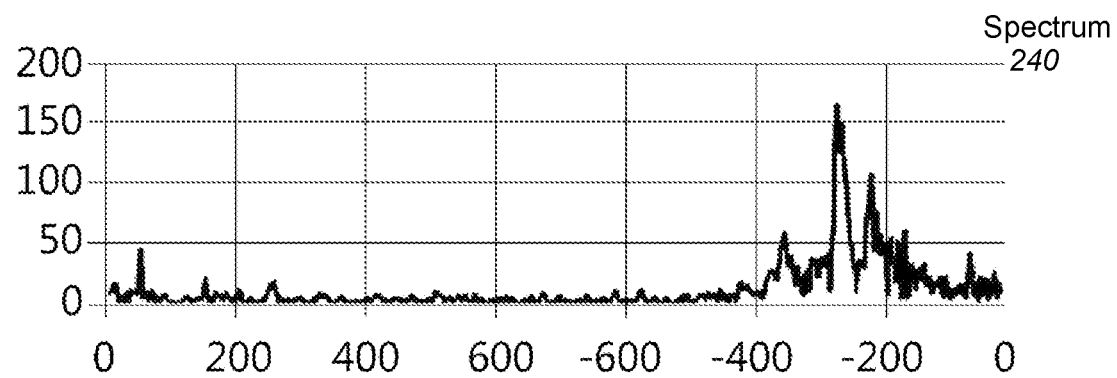
FIG. 2d shows a graph of a magnitude of a FFT transform of a dual-channel motion sensor signal, FIG. 3 schematically shows an example of an embodiment of a dual-channel motion sensor.

FIGS. 2c and 2d further illustrate the sensitivity to motion direction. FIGS. 2c and 2d are similar to FIGS. 2a and 2b except that the person is walking away from the sensor. Also in this case spectrum 230 of the single channel sensor shows a repeated peak. However, spectrum 240 for the two-channel sensor shows a single peak. Different from FIG. 2c the peak is now located at negative frequencies indicating that the motion is away from the sensor rather than towards the sensor.

Motion sensor 100 comprises a noise cancelation unit 140 that exploits this difference. Noise cancelation unit 140 is configured to cancel in the motion components, two motion components that correspond to motions with opposite directions.

For example, a motion component corresponding to a particular frequency may be subtracted from a motion component with the same frequency but opposite sign to cancel the motion components that correspond to motions with opposite directions. For example, suppose an array $F_+[i]$ represents motion components with a direction towards the sensor, with index i running over the motion components. For example, two motion components $F_+[i_0]$ and $F_+[i_1]$ for two different values of index i may correlated to motions of different speeds, though both of them are directed toward the sensor. Note that the actual motions in the environment, do not need to be directed towards the sensor; for example, a direction component, e.g., obtained by projecting the actual motion direction onto the line from moving object to the sensor may be represented in the motion components. Suppose a second array $F_-[i]$ represents motion components with a direction away from the sensor, with index i running over the motion components. For example, motion components $F_+[i]$ and $F_-[i]$ may represent a motion with the same speed but with a different direction with respect to the sensor. To cancel vibration motions, e.g., so-called hum-type noise, a new array may be computed $F[i]=F_+[i]-F_-[i]$. A typical vibrating motion has a small positional change, and equal speeds towards and away from the sensor, note that any orthogonal component with respect to the sensor may be ignored. In array F, a moving object which does not vibrate, in particular a moving, say walking, person, contributes to one or more value in the $F_+$ array but not to the $F_-$ array, or vice versa. However, a vibrating object would contribute both to the $F_+$ and to the $F_-$ array, and in fact, will typically do so with equally. By subtracting the two components the contributions of the vibrating object to the motion components are cancelled, but the walking motion is not.

Many variants are possible. For example, the arrays $F_+$, $F_-$, and $F$ may be represented in different manners. In particular, arrays $F_+$ and $F_-$ may be represented in a single array. For example, array values from 0 to N/2 may represent positive frequencies, while array entries from N/2 to N may represent negative frequencies. In case the amplitudes at positive and negative frequencies differ in sign, this may be resolved by taking magnitudes, e.g., $F[i]=|F_+[i]|-|F_-[i]|$, by ignoring the imaginary or real part, of by removing signs from the imaginary and real part, e.g., mapping all amplitudes to the same quadrant, etc.

Several improvements can be made to this approach. For example, one may correct for a phase difference different from 90 degrees, or for an amplitude difference between the two channels, e.g., as cause by non-perfect components. This is further expanded upon below.

There is no need to compute with complex values, in particular not after the frequency transform. For example, one may replace the amplitudes in $F_+$ and $F_-$ with their magnitudes. For example, in the above notation, one may compute $F[i]=||F_+[i]|-|F_-[i]||$. Interestingly, subtracting even reduces hum-noise if a hum-noise and a motion causes an elevated frequency bin for the same frequency.

Finally, motion in the environment may be detected by motion detector 150. For example, motion detector may be configured to detect motion in the environment from the motion components that are not cancelled. For example, detecting motion may comprise determining an energy in the non-cancelled motion components. The environment may be classified as motion if the determined energy exceeds a threshold. For example, motion detector 150 may be configured to detect motion from the motion components $F[i]=F_+[i]-F_-[i]$, e.g., by summing $|F[i]|^2$.

Detecting motion may comprise detecting motion on a per-bin basis. This has the advantage that a different motion-threshold may be used for different frequencies. Detection can be done after noise cancelation, e.g., by subtracting all positive frequencies from all negative frequencies. Detection can also done together. For example, one may decide for each elevated bin, if it corresponds to motion or to hum-noise; in the former case it is said to call motion. The presence or absence of an elevated bin at the opposite frequency may then be taken as a factor for the presence or absence of noise. However, other factors may also be taken into account. For example, true motion typically causes multiple sequential elevated bins, while hum-noise typically elevates only a one or a few, say two bins. After per-bin identification has been done, motion detection can be determined on the basis of the bins that are determined to relate to motion; e.g., summing energy in motion calling bins.

For example, motion detecting may comprise detecting bins with an elevated magnitude. For each bin with higher magnitude, e.g., compared to a threshold for that bin, that bin may be said to having seen motion. In addition to the hum-noise cancelling properties of the signal processing described herein, other signal processing may be done, in particular other algorithms may be applied to detect hum-noise and/or true motion. For example, for each run of the motion algorithm, each elevated frequency bin may be checked for the hum condition. Only frequency bins that call motion and/or which are not identified as a hum may contribute to detecting motion. Note that, true motions will trigger a motion call even if a hum condition exists in one or more bins. In an embodiment, the motion detector may, for each time slice, check all frequency bins for increased magnitude and motion.

After the conversion from the time-domain to the frequency-domain, motion is detected by a motion detect unit 150 from the frequency bins, e.g., from the magnitudes of the frequency ranges.

For example, motion detect unit 150 may be configured to identify frequency bins having an increased magnitude. For example, a magnitude may be detected that is higher than a threshold value. The threshold value may be predetermined. A high value in a frequency bin may correspond to large or many objects with the corresponding velocity. However, a frequency bin with an increased magnitude may also be caused by noise. There may be one or a few thresholds for all bins, or there may be a threshold for each bin, etc.

For example, motion detect unit 150 may be configured to estimate if the identified frequency bins correspond to a motion source in the environment or to a noise source in the environment.

Figure 4A:
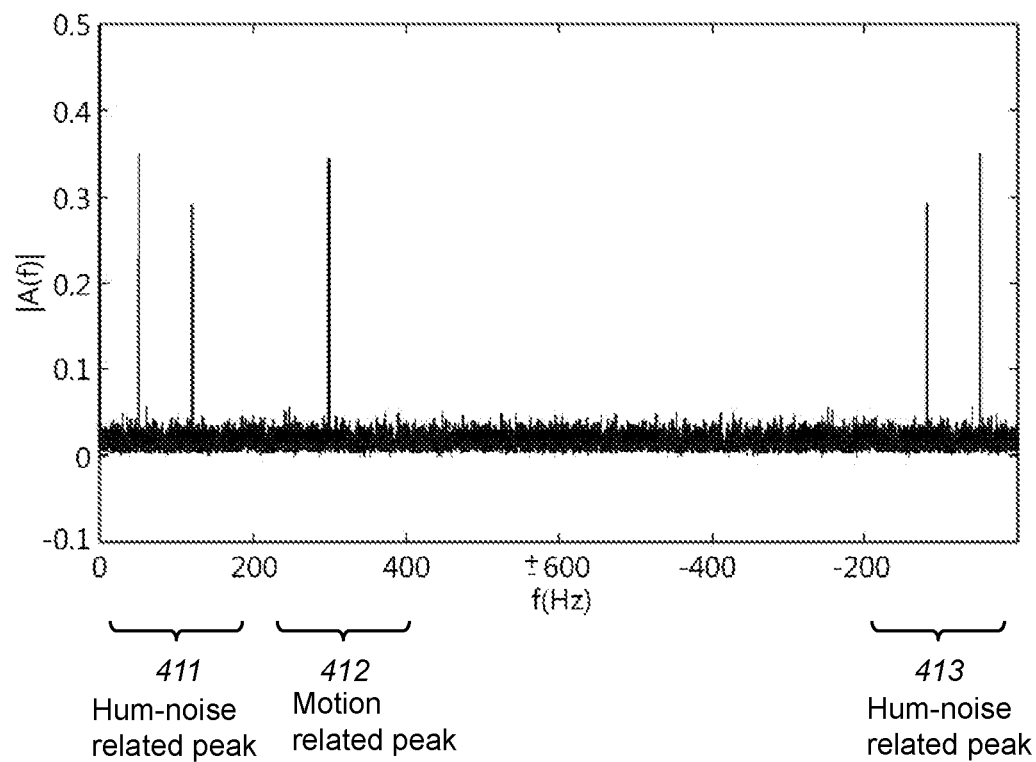
FIG. 4a shows a graph of a magnitude of a FFT transform of a dual-channel motion sensor signal.

FIG. 4a shows a spectrum of a magnitude of a FFT transform of a dual-channel motion sensor signal. Spectrum 4a was created from a computer simulation of a two-channel Doppler motion sensor. In the simulation, there is one object moving and there are two sources of hum-type noise. A complex frequency transformation obtained an array $A(\omega)$ which represents the amplitude for a frequency $\omega$. In this example, the frequency runs from −600 Hz to +600 Hz. FIG. 4a graphs the absolute value of the amplitude for the frequencies. Note that FIG. 4a shows a number of peaks caused by the Doppler shift induced by motion in the environment. The peaks at 411 between about 0 and 200 Hz are caused by a vibration in the environment. This vibration motion also causes peaks at corresponding negative frequencies, which can be seen at 413, e.g., between about 0 and −200 Hz. Also shown in FIG. 4a is a peak at 412. This peak, at about 300 Hz, corresponds to a non-vibrating motion. Note that peak 413 is not mirrored at −300 Hz.

Figure 4B:
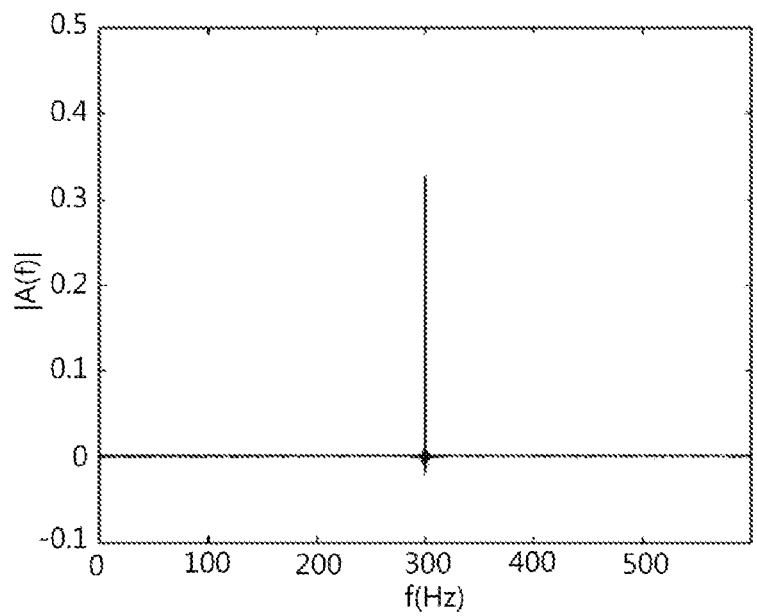
FIG. 4b shows a graph of a magnitude of a FFT transform with noise-cancelation.

FIG. 4b shows a graph of a magnitude of a FFT transform with noise-cancelation. FIG. 4b is obtained from graph 4a by subtracting the magnitude of the negative frequencies from the corresponding positive frequencies. As a result the peaks corresponding to hum-noise have completely cancelled, while the peak at 300 Hz corresponding to non-vibrating motion remains. From FIG. 4b motion can be detected with increased reliability since false-positives from hum-noise has been reduced. Note that FIG. 4b does not contain noise, which is an artefact of the simulation.

Figure 4C:
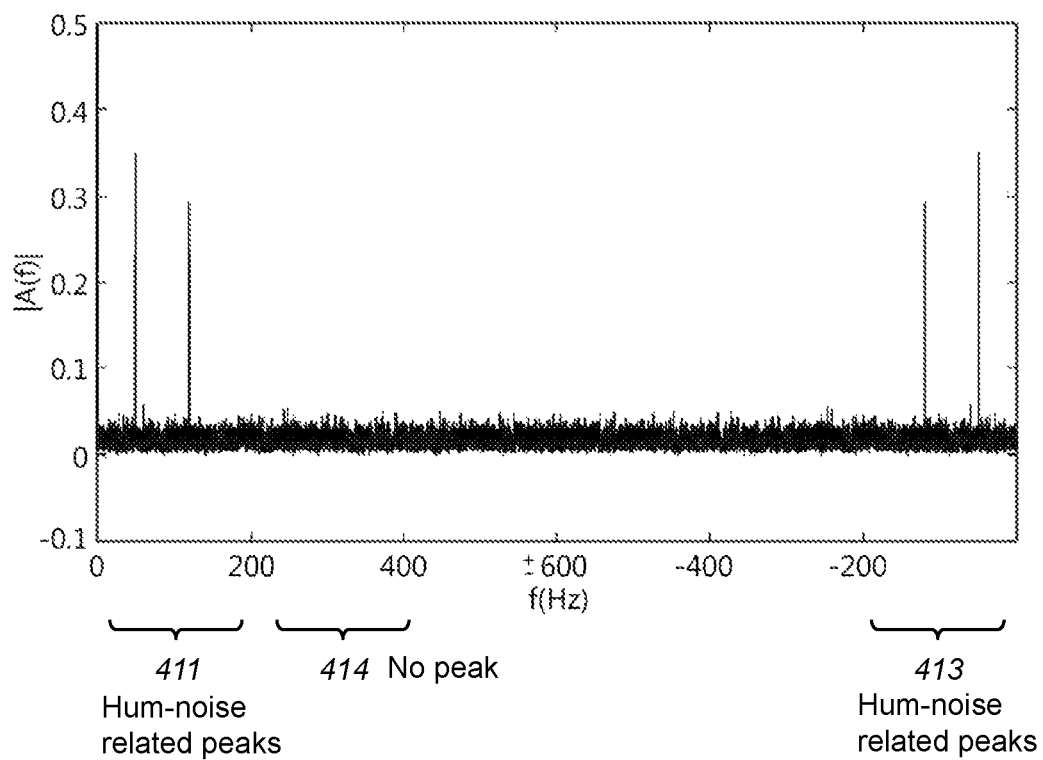
FIG. 4c shows a graph of a magnitude of a FFT transform of a dual-channel motion sensor signal.
Figure 4D:
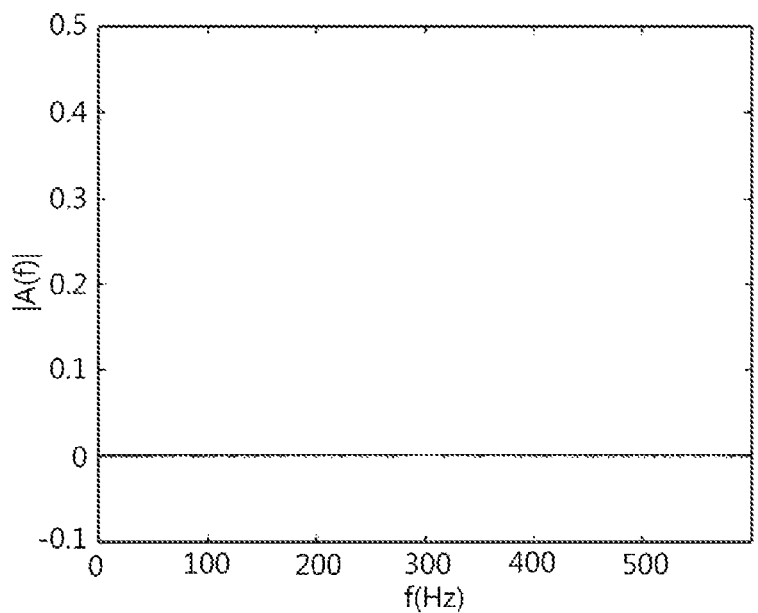
FIG. 4d shows a graph of a magnitude of a FFT transform with noise-cancelation, FIG. 5a schematically shows an example of an embodiment of a motion detector, FIG. 5b schematically shows an example of an embodiment of a motion detector, FIG. 6 schematically shows an example of an embodiment of a motion detector method, FIG. 7a schematically shows a computer readable medium having a writable part comprising a computer program according to an embodiment, FIG. 7b schematically shows a representation of a processor system according to an embodiment.

FIGS. 4c and 4d are illustrations to show the effect of removing the true motion from the environment of the sensor but leaving the hum-noise. The peak at 412 has been removed, as no true motion is present, though the peaks caused by hum-noise are still present. FIG. 4d shows what the resulting noise-cancelled graph would look like; no peaks are left. When a motion detection algorithm is applied to FIG. 4d instead of FIG. 4b, no motion would be detected as no energy is left in the spectrum.

Note that the difference in energy between FIGS. 4a and 4c is relatively smaller than the difference in energy between FIGS. 4b and 4d, this shows that is it easier to set accurate thresholds for FIGS. 4b and 4d to detect motion than for FIGS. 4a and 4c. To make matter worse, the number of hum sources may change over time. Hum may be present from seconds to hours, from on or multiple sources. The scale of the axes in FIGS. 2a-2d and 4a-4d were set automatically.

A problem with motion sensors, in particular also with Doppler type motion sensors is a type of noise, referred to as hum noise. Hum noise sources cause elevated signals in a certain frequency bin, often intermittently. Hum noise may be caused by vibrations, e.g., caused by e.g., a driver inside a luminaire or an external device. Hum noise may also be caused by mechanical structures in the environment such as a lamella optic present in T-LED fixtures. Hum noise tends to be localized to one or two adjacent frequency bins, e.g., having a bandwidth of around few Hertz, but hum noise may sometimes span more than 2 bins as well.

The intermittent nature of the signal can cause false positive motion calls. For example, a hum noise-source, e.g., an electronic driver or a lamella optic may cause an increase in a particular frequency bin, which in turn may be interpreted as motion in the area surrounding the sensor, but which in reality is only due to the hum noise.

Motion detector 150 may be configured to classify the environment as quiet or motion from the noise cancelled motion components, e.g., frequency bins.

There are various ways in which motion detector 150 can make the classification. For example, depending on the application, the motion detector may be configured to detect small motions or not. For example, a motion detector used in an office for lighting control may be configured with a low threshold for motion, e.g., to detect motions such as typing. For example, a motion detector used in a hallway for lighting control may be configured with a larger threshold for motion, e.g., to detect larger motions such as walking. This avoids, in the first case, that lights turn off when occupants are relative motionless expect for small motions such as typing, or, in the second case, that lights in a hallway turn on to easily due to false-positives.

For example, motion detector 150 may be configured to determine an energy in the frequency bins, e.g., the frequency bins or parts thereof that are estimated as corresponding to a motion source. The environment may be classified as motion if the determined energy exceeds a threshold. For example, energy may be computed by squaring and adding the frequency bins. For example, the energy may be a weighted energy. For example, frequencies that correspond to walking speed may be given a higher weight than those that do not. If the energy or weighted energy in the bins that correspond to motion, e.g., that do not correspond to noise, exceed a threshold then the area is classified a motion. If not, then the area may be classified as quiet. By tuning the threshold and/or the weighing, the sensitivity of the motion detector may be tuned as desired for the application. This can be done empirically.

Instead of classifying the environment as motion or quiet, e.g., in a binary classification, the motion sensor may report a value indicating the likelihood that there is motion in the environment. For example, the energy in the noise-cancelled spectrum may be mapped to a floating point value, e.g., a fraction between 0 and 1, e.g., using a sigmoid function.

At the edges of the frequency bins, e.g., at the higher and lower bins some special considerations may be needed. The inventors also found that at the lower end of frequencies the sensors where often unreliable. In an embodiment, frequency bins below a frequency floor are estimated as cause by noise. For example, the noise frequency floor may be less than 9.3 Hz for a 5.8 Ghz sensor. These low frequencies are found to have more spurious signals and are therefore not reliable and consistent. For other sensor modalities this value will change proportionally. For example, this cut-off frequency increases with the frequency of the sensor for a Doppler sensor.

A motion detector with noise filtering such as motion detector 100 runs a risk of ignoring a motion signal, e.g., mistaking a true motion as noise-caused. As pointed out herein various parameters discussed can be tuned to increase or decrease the likelihood of this happening. The inventors found that mistaking true-motion for noise in a lighting, such as luminaire 170 or lighting system 171 will have more severe effects if people are actually present. In an embodiment, this can be avoided by suppressing noise reduction if people are present, for example if the light emitting element is turned on. Noise reduction can be turned off all together or a different trade off can be configured by changing its parameters.

If the lights are ON, this implies presence of persons in the detection area. If a noise filter detects a motion signal as noise, and eliminates it, this may not immediately result in severe effect since the lights may not switch off immediately; they may be configured to stay ON for some time after detecting motion. The system keeps looking for a motion and if it sees at least one motion within the configured time interval before it switches OFF, the previous mistake of a false negative is not observed at the system level since the effect is not visible. However, if within said configured interval no other motion was seen then the lights would eventually switch OFF, resulting in unpleasant behavior.

Typically, the motion detector 100, luminaires 170, 171, lighting controller 175 each comprise a microprocessor which executes appropriate software stored at these devices; for example, that software may have been downloaded and/or stored in a corresponding memory, e.g., a volatile memory such as RAM or a non-volatile memory such as Flash. Alternatively, the devices may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc.

In an embodiment, the motion detector comprises one or more electronic circuits. The circuits implement the corresponding units described herein. The circuits may be a processor circuit and storage circuit, the processor circuit executing instructions represented electronically in the storage circuits. A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

A challenge for motion sensors is to not have false positives, e.g., to not have false triggers in case of a non-motion signals such as hum/vibrations, which are quite common. The inventors observed that sometimes during the running of a motion sensor for motion detection, a sudden vibration is seen in the frequency domain which tends to be more localized to one or two adjacent frequency bins, e.g., having a bandwidth of around few Hertz. Such vibrations are generally consistently present for at least few seconds to even sometimes minutes or hours. These vibrations are referred to as hum since they are more localized. In contrast, a motion signal is much broader in the frequency spectrum and therefore, this property can be used to isolate a sudden starting of hum signal versus a motion signal.

As described above, noise sources can cause intermittent elevated signals in a certain frequency bin. The intermittent nature of the signal can cause false positive motion calls. This problem may be addressed with noise cancelation unit 140, e.g., by reducing the amplitude of frequency bins that are likely affected by noise, in particular hum-type noise. Removing such bins from considerations for motion detection may also work as a noise filter. A hum detector may be implemented as a filtering enhancement for the motion algorithm that identifies frequency bins experiencing a hum condition and eliminates their contribution to calling motion. The additional signal processing was found to detect and account for hum or vibrations, so that they are not classified as motions.

In a Doppler sensor, the frequency for a moving object can be estimated. In general, for a sensor with frequency $f_0$, one may use the relationship:

$$\Delta v = \frac{c}{2 f_0} \Delta f,$$

wherein c is the speed of light, $f_0$ is the frequency of the sensor, $\Delta f$ describes the Doppler frequency. Vibrations differ from human motions in that, e.g., excited bins for vibrations are often more narrow, and in that the f for vibrations often does not change over time. If the time domain signal would be sampled at 240 Hz, it may be analyzed using a 128-point FFT.

Although the hum detector parameters can be carefully tuned, there is always the risk that the hum filter identifies motion events as a vibration. This could be of particular importance for small motions such as motions that humans make behind a desk in the office. In order to circumvent this problem, the hum filter can be switched off in case people are present. One method for incorporating this aspect is to have the hum filter active in case the light is off and the hum filter switched off if the light is on.

Vibrations are often due to mechanical structures in the environment such as a lamella optic present in T-LED fixtures. These vibrations often have the same signature. For this reason, the hum detector often has to deal with vibrations that are very similar. Instead of relying on the hum detector's instantaneous ability to filter these out, the hum detector may also at some point, e.g., if the vibrations have appeared sufficiently often, completely ignore those frequency bins that have experienced problems with vibrations.

The hum history can be used to identify hums with a higher accuracy. The motion detection algorithm runs at a certain rate, e.g., iteratively, e.g., every 100 ms, the motion detector may report motion/no motion. If a motion signal is observed, it is often not required to report this immediately. In an embodiment, multiple iterations, e.g., 4 iterations which may be 400 ms, before reporting the observed signal. This reduces the chance of false positive motion signals. Although hums start nearly instantaneously, they hardly change after they have started. This means that the hum history also hardly changes. As one has a few frames of time, one can use this time for monitoring changes in the hum history. If these changes fall below a threshold, then one can more confidently indeed identify the signal as vibration and report no-motion. If the history does have changes above a certain threshold, then one can report motion.

The noise detection can be used for any products utilizing a time-varying sensor signal. For example, the noise detection was found effective for a Doppler motion sensor. The noise detection could be used for different types of sensors too. For example, an ambient light sensor suffers from similar noise sources, e.g., vibrational noise, electrical noise, etc.

Returning to FIG. 1a. The noise cancelation described herein removes or reduces the contribution to the motion components of hum-noise. The reduction is degraded if the motion sensor is less than ideal, e.g., if the amplification or sensitivity in the I and Q channels is different. Another problem may occur if the mixers of the motion sensor 110, e.g., mixers 530 and 540 are not accurately orthogonal. If the phase difference is not 90 degrees then one may get a mirroring of the energy of $|\beta A(\omega)|^2$. Note that energy is typically computed as the square of amplitudes.

Furthermore, the reduction is improved if the mixed signals have little losses and are accurate, since this causes the amplitudes at the two frequencies to be closer to each other. Unfortunately, in an embodiment, the motion sensor may be less than ideal, causing divergences between an expected behavior in the frequency spectra.

Noise cancelation unit 140 may be configured to correct for deficiencies in the motion sensor 110.

Figure 5A:
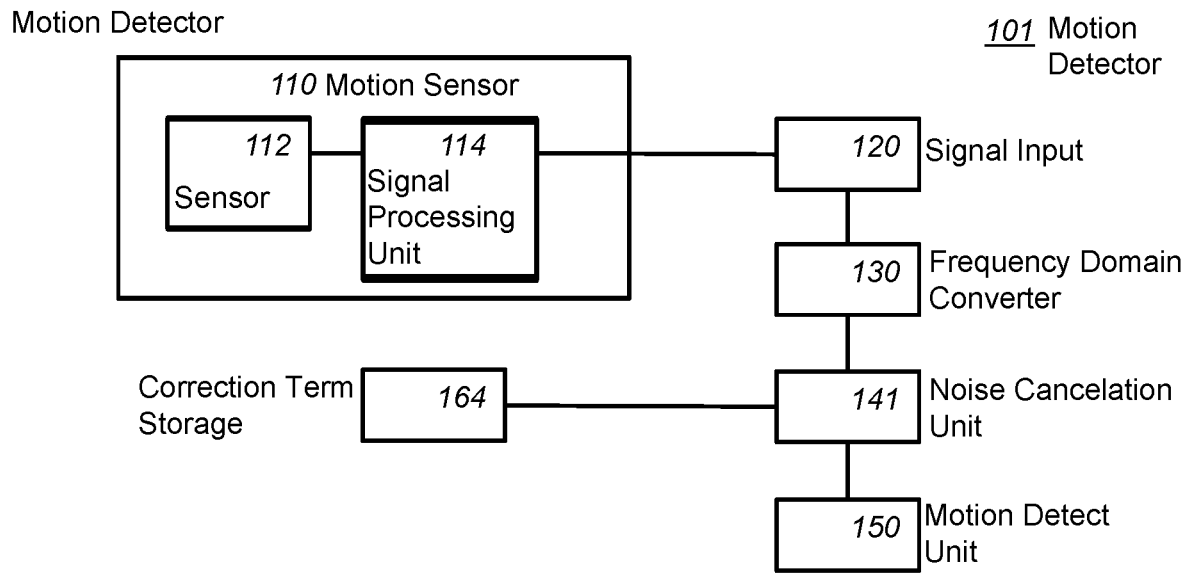

FIG. 5a schematically shows an example of an embodiment of a motion detector 101. Detector 101 may be the same as detector 100 except for the addition of a correction term storage 164 and a modified noise cancelation unit 141. For example, the correction term storage 164 may store a correction factor β. Noise cancelation unit 141 may be configured to multiply one of the two motion components with the correction factor β before subtracting the two motion components. The correction factor β may a real number, e.g., magnitudes are used. The correction factor β may be a complex number if the correction is made on complex values, e.g., on the amplitudes.

A particular advantageous way to compute the difference between the motion components is to use the following equation: $|\|A(\omega)|-\beta|A(-\omega)\|-\||A(-\omega)|-\beta|A(\omega)\||$, wherein $|A(\omega)|$ represents the magnitude of a motion components for frequency ω.

For example, assuming that the choices for signal construction are such that positive frequencies correspond to motions towards the sensor while negative frequencies correspond to movement away from the sensor. If the signal amplification between I and Q is slightly different, then a movement towards the sensor will not only have a nonzero FFT-amplitude at some positive frequency but also a smaller nonzero FFT-amplitude at the corresponding negative frequency, smaller is here in terms of the norm as the amplitudes are complex. As an example, assume that the frequency conversion obtains for ω=12, different values for A(12) and A(−12) although it is known that these correspond to the same motion, and so, one of them ought to be zero. Then the correction factor may correct for this. For example, suppose A(12)=5+5i and A(−12)=1−1i. In this case, one can choose to be $|1-1i|/|5+5i|=\frac{1}{5}$.

The expression above can now be evaluated and reads for ω=12

$$\||5+5i|-|1-1i|^2/|5+5i|\|-\||1-1i|-|1-1i|/|5+5i|*|5+5i|\|=\||5+5i|-|1-1i|^2/|5+5i|\|-0|$$

Note that the above expression is non-zero as expected since it represents a motion. Note that the reduction in magnitude of the motion component is much smaller than the reduction would have been for the equation $\|A(\omega)|-|A(-\omega)\|$. In the former case the value $|5+5i|$ is reduced with $$\frac{|1-1i|^2}{|5+5i|}$$

instead of with |1−1i| in the latter case. Note that the latter term is much larger. The above equation thus reduces in-advertent cancelation of true motion in case of a less-then-ideal sensor. Interestingly, however, in case of a vibration where |A(12)|=|A(−12)| one still finds that the expression in the claim equals 0. Typically, in case of a vibration, it is indeed the case that approximately |A(ω)|=|A(−ω)|, since the inadvertent contribution of an excitation to A(−ω) instead of to A(ω) is about the same as the inadvertent contribution of an excitation to A(ω) instead of to A(−ω).

The correction factor does not need to be linear or affine, for example one could define a function G, e.g., to define a non-linear mapping. Function G may act directly on complex value, e.g., as follows:

$$\||G(A(\omega))|-|G(A(-\omega))|-\|G(A(-\omega))|-|G(A(\omega))|\|,$$

Instead of acting on complex values, function G may act on the magnitudes instead.

Figure 5B:
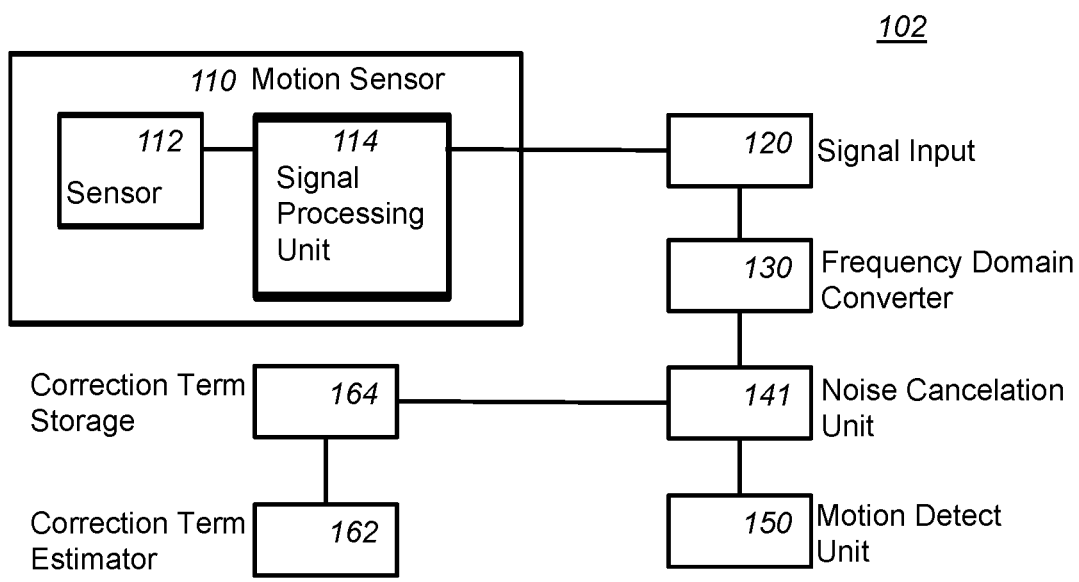

FIG. 5b schematically shows an example of an embodiment of a motion detector 102. Detector 102 may be the same as detector 101 except for the addition of a correction term estimator 162. The correction factor or function may be estimated and stored in the motion detector 101. For example, the correction factor may be estimated under laboratory conditions. Another approach is to estimate the correction factor during use of the sensor. For example, correction term estimator 162 may be configured to estimate the correction factor during use of the motion sensor.

For example, correction term estimator 162 may comprise an algorithm to determine that motion component is likely caused by non-vibrating motion. For example, the algorithm may comprise comparing the magnitude of the motion component to a threshold, under the assumption that true motion typically gives a large motion component. For example, the algorithm may verify that neighboring motion components are also elevated, since true motion is typically spread over multiple motion components, for example, a string of ±k sequential motion components in front and after a particular motion component should be over a further threshold to conclude that the particular motion component corresponds to motion. For example, k may be 2 or 3, or more, etc. If a signal is believed to be motion, e.g., as determined by the algorithm, then the correction factor can be estimated. For example, when using the above formula one may estimate β=|A(−ω)|/|A(ω)|, assuming the true motion is at ω, e.g., if |A(ω)| is larger than |A(−ω)|.

Estimating the correction factor runs the risk of that the motion signal may be mixed with low amplitude vibrations. In order to cancel such effects out one may use a moving average that averages β over the last n observations.

Figure 6:
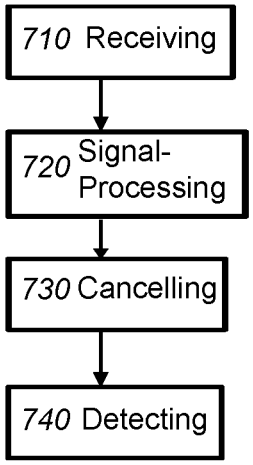

FIG. 6 schematically shows an example of an embodiment of a motion detect method 700. The motion detection method (700) comprises:
- receiving (710) a motion signal from a motion sensor, said motion signal being correlated with motion in an environment of the motion sensor,
- signal-processing (720) the motion signal to obtain multiple motion components, a motion component being correlated with a direction and velocity of a motion in the environment,
- cancelling (730) in the motion components, two motion components that correspond to motions with opposite directions,
- detecting (740) motion in the environment from the motion components that are not cancelled.

Many different ways of executing the method are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. For example, steps 730, 740 may be executed, at least partially, in parallel. Moreover, a given step may not have finished completely before a next step is started.

Embodiments of the method may be executed using software, which comprises instructions for causing a processor system to perform method 700. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 7A:
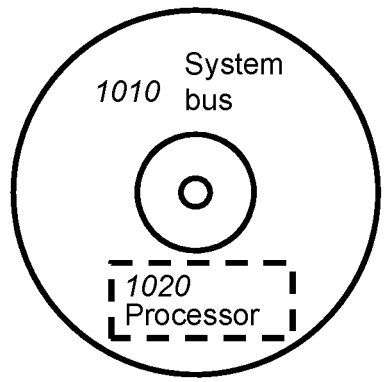

FIG. 7a shows a computer readable medium 1000 having a writable part 1010 comprising a computer program 1020, the computer program 1020 comprising instructions for causing a processor system to perform a motion detection method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said motion detection method.

Figure 7B:
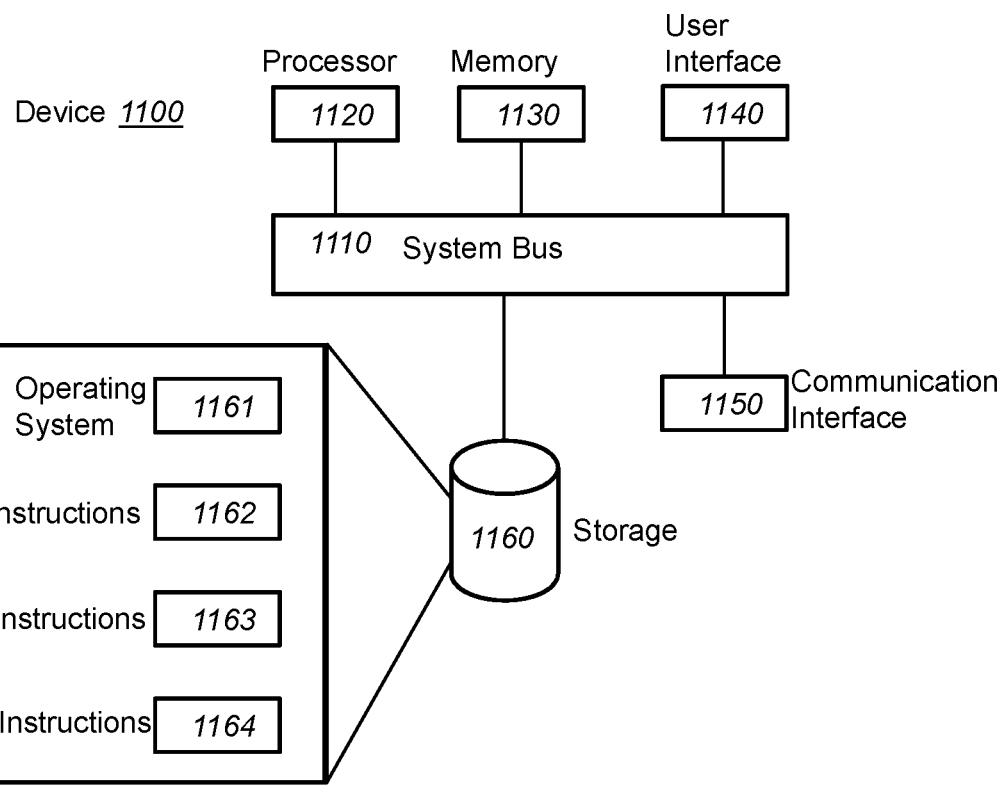

FIG. 7b illustrates an exemplary hardware diagram 1100 for implementing a device according to an embodiment. As shown, the device 1100 includes a processor 1120, memory 1130, user interface 1140, communication interface 1150, and storage 1160 interconnected via one or more system buses 1110. It will be understood that this figure constitutes, in some respects, an abstraction and that the actual organization of the components of the device 1100 may be more complex than illustrated.

The processor 1120 may be any hardware device capable of executing instructions stored in memory 1130 or storage 1160 or otherwise processing data. As such, the processor may include a microprocessor, field programmable gate array (FPGA), application-specific integrated circuit (ASIC), or other similar devices. For example, the processor may be an Intel Core i7 processor, ARM Cortex-R8, etc. In an embodiment, the processor may be ARM Cortex M0.

The memory 1130 may include various memories such as, for example L1, L2, or L3 cache or system memory. As such, the memory 1130 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 1140 may include one or more devices for enabling communication with a user such as an administrator. For example, the user interface 1140 may include a display, a mouse, and a keyboard for receiving user commands. In some embodiments, the user interface 1140 may include a command line interface or graphical user interface that may be presented to a remote terminal via the communication interface 1150.

The communication interface 1150 may include one or more devices for enabling communication with other hardware devices. For example, the communication interface 1150 may include a network interface card (NIC) configured to communicate according to the Ethernet protocol. For example, the communication interface 1150 may comprise an antenna, connectors or both, and the like. Additionally, the communication interface 1150 may implement a TCP/IP stack for communication according to the TCP/IP protocols. Various alternative or additional hardware or configurations for the communication interface 1150 will be apparent.

The storage 1160 may include one or more machine-readable storage media such as read-only memory (ROM), random-access memory (RAM), magnetic disk storage media, optical storage media, flash-memory devices, or similar storage media. In various embodiments, the storage 1160 may store instructions for execution by the processor 1120 or data upon with the processor 1120 may operate. For example, the storage 1160 may store a base operating system 1161 for controlling various basic operations of the hardware 1100. For example, the storage may store instructions 1162 for signal-processing the motion signal to obtain multiple motion components, e.g., converting the sensor signal to a frequency domain, obtaining a plurality of frequency bins, instructions 1163 for cancelling in the motion components, two motion components that correspond to motions with opposite directions, e.g., for reducing a magnitude of a first motion component associated with a first movement in response to a second motion component associated with a second movement, which is opposite to the first movement, and instructions 1164 for detecting motion in the environment from the motion components that are not cancelled.

It will be apparent that various information described as stored in the storage 1160 may be additionally or alternatively stored in the memory 1130. In this respect, the memory 1130 may also be considered to constitute a "storage device" and the storage 1160 may be considered a "memory." Various other arrangements will be apparent. Further, the memory 1130 and storage 1160 may both be considered to be "non-transitory machine-readable media." As used herein, the term "non-transitory" will be understood to exclude transitory signals but to include all forms of storage, including both volatile and non-volatile memories.

While device 1100 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1100 is implemented in a cloud computing system, the various hardware components may belong to separate physical systems. For example, the processor 1120 may include a first processor in a first server and a second processor in a second server.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C.

In the claims references in parentheses refer to reference signs in drawings of exemplifying embodiments or to formulas of embodiments, thus increasing the intelligibility of the claim. These references shall not be construed as limiting the claim.

The invention claimed is:

1. A luminaire comprising a motion detector, the motion detector comprising:
   a motion sensor interface configured to receive a motion signal from a motion sensor, said motion signal being correlated with motion of objects in an environment of the motion sensor,
   a processor system configured to:
      signal-process the motion signal to obtain multiple motion components, a motion component being correlated with a direction and velocity of a motion in the environment,
      cancel in the motion components, two motion components that correspond to motions with opposite values to remove the contribution of the two motion components that correspond to motions with the opposite values,
      detect motion of objects in the environment from the motion components that are not cancelled,
      wherein the luminaire being connectable to a light-emitting element and being configured to control the light-emitting element at least in dependency upon the motion detector.

2. The luminaire as in claim 1, wherein the motion signal received by the motion sensor interface comprises a first channel (I) and a different second channel (Q), the first and second channel being correlated with motion in the environment of the motion sensor.

3. The luminaire as in claim 2, wherein the signal-processing comprises obtaining a complex signal from the first and second channel (I+jQ), by a frequency transformation.

4. The luminaire as in claim 2, wherein the sensor is a two-channel Doppler microwave sensor.

5. The luminaire as in claim 1, wherein the signal-processing comprises transforming the motion signal from a time-domain to a frequency-domain to obtain the multiple motion components.

6. The luminaire as in claim 5, wherein the motions with opposite directions contribute to different motion components of the multiple motion components.

7. The luminaire as in claim 1, wherein the multiple motion components correspond to a frequency, motions with opposite directions contribute to motion components having the same frequency but an opposite sign.

8. The luminaire as in claim 1, wherein a motion component corresponding to a frequency is subtracted from a motion component with the same frequency but opposite sign to cancel the motion components that correspond to motions with opposite directions.

9. The luminaire as in claim 1, wherein cancelling two motion components comprises multiplying one of the two motion components with a correction factor ($\beta$) before subtracting the two motion components.

10. The luminaire as in claim 1, wherein cancelling the two motion components comprises computing $$|||A(\omega)|-\beta|A(-\omega)||-||A(-\omega)|-\beta|A(\omega)|||,$$

wherein $|A(\omega)|$ represents the magnitude of a motion components for frequency $\omega$, and $\beta$ represents a correction factor.

11. The luminaire as in claim 9, wherein the processor system is configured to estimate the correction factor during use of the motion sensor.

12. The luminaire as in claim 11, wherein the processor system is configured to:
   determine if a motion signal corresponds to a non-vibrating motion,
   estimate the correction factor from the motion signal.

13. The luminaire as in claim 1, the luminaire further comprising at least one light-emitting element.

14. A motion detection method comprising:
   receiving a motion signal from a luminaire comprising a motion sensor, said motion signal being correlated with motion of objects in an environment of the motion sensor, wherein said luminaire being connectable to a light emitting element,
   signal-processing the motion signal to obtain multiple motion components, a motion component being correlated with a direction and velocity of a motion in the environment,
   cancelling in the motion components, two motion components that correspond to motions with opposite values to remove the contribution of the two motion components that correspond to motions with the opposite values,
   detecting motion of objects in the environment from the motion components that are not cancelled,
   controlling the light emitting element at least in dependency upon the motion sensor.

15. A non-transitory computer readable medium comprising data representing instructions to cause a processor system to perform the method according to claim 14.

* * * * *